(12) United States Patent
Sato

(10) Patent No.: US 9,574,953 B2
(45) Date of Patent: Feb. 21, 2017

(54) MAGNETIC FORCE SENSOR

(71) Applicant: CANON KABUSHIKI KAISHA, Tokyo (JP)

(72) Inventor: Shuuichi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/548,144

(22) Filed: Nov. 19, 2014

(65) Prior Publication Data

US 2015/0068326 A1 Mar. 12, 2015

Related U.S. Application Data

(63) Continuation of application No. 13/509,218, filed as application No. PCT/JP2010/070522 on Nov. 11, 2010, now Pat. No. 8,978,488.

(30) Foreign Application Priority Data

Nov. 26, 2009 (JP) ................. 2009-269186

(51) Int. Cl.
*G01L 1/12* (2006.01)
*G01L 1/25* (2006.01)
*G01L 1/14* (2006.01)
*G01L 1/22* (2006.01)
*G01L 5/00* (2006.01)

(52) U.S. Cl.
CPC . *G01L 1/14* (2013.01); *G01L 1/12* (2013.01); *G01L 1/2281* (2013.01); *G01L 5/009* (2013.01)

(58) Field of Classification Search
CPC ............ G01L 1/12; G01L 1/14; G01L 1/2281; G01L 1/125; G01L 1/127
USPC ....................................... 73/862.69
See application file for complete search history.

(56) References Cited

U.S. PATENT DOCUMENTS 2,888,256 A * 5/1959 Sedgfield ................ G01P 15/11
73/497
4,869,108 A * 9/1989 Washisu ................ G01P 15/132
73/514.19

* cited by examiner

*Primary Examiner* — Lisa Caputo
*Assistant Examiner* — Roger Hernandez-Prewit
(74) *Attorney, Agent, or Firm* — Canon U.S.A., Inc., IP Division

(57) ABSTRACT

The present invention provides a magnetic force sensor that can precisely detect and correct variations in a magnetic field generated by a magnetic flux generating source. Therefore, a displacement magneto-electric transducer, which detects a change in the magnetic field caused by an external force, and a fixed magneto-electric transducer, where the change in the magnetic field caused by the external force does not occur, are provided to face end sides of magnetic poles of the magnetic flux generating source. The fixed magneto-electric transducer detects a variation of the magnetic field caused by, for example, changes with time and environmental variations such as a temperature rise in the interior of the sensor. On the basis of a detection amount thereof, an operational section performs a correction operation, so that a sensitivity coefficient or an offset of the displacement magneto-electric transducer is corrected.

5 Claims, 6 Drawing Sheets

--Prior Art--

--Prior Art--

MAGNETIC FORCE SENSOR

CROSS REFERENCE TO RELATED APPLICATIONS

The present application is a continuation of U.S. patent application Ser. No. 13/509,218, filed on May 10, 2012, the content of which is expressly incorporated by reference herein in its entirety. This application also claims the benefit of Japanese Patent Application No. 2009-269186, filed Nov. 26, 2009, and International Application No. PCT/JP2010/070522, filed Nov. 11, 2010, both of which are hereby incorporated by reference herein in their entirety.

TECHNICAL FIELD

The present invention relates to a magnetic force sensor that detects a force or a moment component and that detects a magnetic flux change in a magnetic flux generating source using a magneto-electric transducer. In particular, the present invention relates to a correction operation when a magnetic field generated at the magnetic flux generating source is changed.

BACKGROUND ART

When, for example, parts are assembled using a robot arm, a force sensor is mounted to a wrist portion of the robot arm, detects a force or a moment component that is generated during an assembly work, and controls an orientation of a hand portion. A force sensor that makes use of a method of magnetically detecting a displacement of an action portion is discussed in Japanese Patent Laid-Open No. 2004-325328 (Patent Document 1).

A related structure that is discussed in Japanese Patent Laid-Open No. 2004-325328 is shown in FIGS. 5A and 5B. In the related structure, a permanent magnet 14 embedded in a resilient member and four magneto-electric transducers 15a to 15d opposing magnetic poles of the permanent magnet are disposed. When an action force is applied to the resilient member, the permanent magnet 14 is displaced, and the magneto-electric transducers 15a to 15d, such as Hall elements, detect a change in a magnetic field that is generated thereby. On the basis of the detected change in the magnetic field, it is possible to detect force components in an X-axis direction, a Y-axis direction, and a Z-axis direction.

In Japanese Patent Laid-Open No. 2004-325328, a permanent magnet is used for a magnetic flux generating source. In general, an absolute value of the strength of a magnetic field that is generated by a permanent magnet is changed by the temperature of the permanent magnet (that is, the absolute value has a predetermined temperature coefficient). When the temperature of the permanent magnet is increased due to heat generated from a circuit board and heat received from the outside, such as a motor disposed in the vicinity thereof, the strength of the magnetic field is reduced. Therefore, an apparatus used in the magnetic field generated by the permanent magnet needs to compensate for the change in the magnetic field caused by its temperature. The magnetic field changes due to changes with time of the permanent magnet in addition to the influences of, for example, the temperature thereof.

In contrast, in Japanese Patent Laid-Open No. 2005-321592 (Patent Document 2), a method of performing temperature compensation using a temperature compensation circuit that is provided with a temperature sensor is used.

A related structure discussed in Japanese Patent Laid-Open No. 2005-321592 is shown. FIG. 6A shows a Hall element 16 provided at a position opposite to a permanent magnet 14. FIG. 6B shows a temperature compensation circuit connected to a constant voltage source (not shown) provided adjacent to the Hall element.

When an output voltage from the Hall element to a selector is reduced by a temperature rise, a negative temperature characteristic of the temperature sensor provided in the temperature compensation circuit provided adjacent to the Hall element causes a current value output to the Hall element from the temperature compensation circuit to increase in proportion to the temperature rise.

By outputting the increased current to the Hall element, the output voltage from the Hall element 16 to the selector that has been reduced by the temperature rise is increased.

However, in the related example discussed in Patent Document 2, temperature compensation is performed on the output of the Hall element that receives a magnetic flux. Therefore, when there is a difference between the heat capacities of the permanent magnet and the temperature sensor (specific heat) or a localized temperature rise (for example, the temperature of the Hall element changes whereas the temperature of the permanent magnet 14 itself is increased), it is difficult for the temperature sensor to precisely measure the average temperature of the permanent magnet. In addition, the temperature compensation circuit needs to be provided separately from a sensor of, for example, the permanent magnet and the Hall element, thereby increasing costs and size.

The present invention is carried out to overcome the aforementioned problems, and provides a compact magnetic force sensor that can precisely detect and correct variations in a magnetic field generated by a magnetic flux generating source.

SUMMARY OF INVENTION

The present invention provides a magnetic force sensor that detects a force on the basis of a position of an action portion and a position of a magnetic flux generating source relative to each other, the action portion being displaceable by the force that the action portion receives. The magnetic force sensor includes the action portion resiliently supported by a supporting member; a first magneto-electric transducer fixed to the action portion; the magnetic flux generating source disposed so as to face the first magneto-electric transducer; a second magneto-electric transducer disposed at a fixed position with respect to the magnetic flux generating source; and an operational processing section that corrects an output of the first magneto-electric transducer on the basis of an output of the second magneto-electric transducer.

According to the present invention, it is possible to provide a force sensor having a compact structure that does not use an additional structural component such as a temperature compensation circuit. According to the magnetic force sensor of the present invention, it is possible to correct variations in a magnetic field generated by a magnetic flux generating source caused by factors other than temperature variations.

DESCRIPTION OF EMBODIMENT

Figure 1:
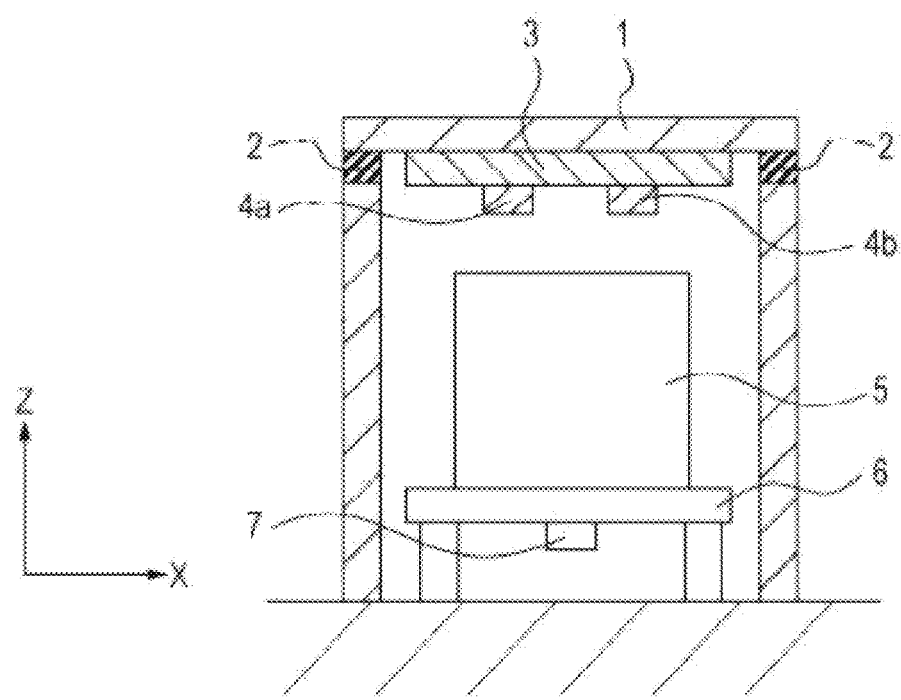
FIG. 1 shows a structure of a magnetic force sensor according to the present invention.

FIG. 1 shows most clearly the feature of the present invention, and is a sectional view taken along an X-Z axis of a magnetic force sensor.

In FIG. 1, reference numeral 1 denotes an action portion to which a force is applied, and reference numeral 2 denotes a resilient member that resiliently supports the action portion 1 at a housing. The action portion 1 is resiliently supported so as to be displaceable when the force is applied to the action portion. Reference numeral 3 denotes a substrate for mounting magneto-electric transducers. Reference numerals 4a and 4b denote magneto-electric transducers (hereunder referred to as "displacement magneto-electric transducers"). Reference numeral 5 denotes a magnetic flux generating source. Reference numeral 6 denotes a mount substrate that supports the magnetic flux generating source 5 and to which a magneto-electric transducer is mounted. Reference numeral 7 denotes the magneto-electric transducer that is provided on the mount substrate 6, and whose position relative to the magnetic flux generating source 5 is fixed (hereunder referred to as "fixed magneto-electric transducer").

The magnetic flux generating source 5 may be a permanent magnet that is typified by a ND—Fe—B magnet, a Sm—Co magnet, a Sm—Fe—N magnet, and a ferrite magnet; or an electromagnet that generates a magnetic force by passing electricity through a coil that is wound upon a magnetic material. The fixed magneto-electric transducer 7 and the displacement magneto-electric transducers 4a and 4b are elements that output changes in a magnetic field as electrical signals, such as Hall elements, MR elements, magnetic impedance elements, flux gate elements, or winding coils. The action portion 1 need not be supported by the housing. The action portion 1 may be supported by a supporting member that can support the action portion 1 using the resilient member.

When a force is applied to the action portion 1, the action portion 1 is displaced, along with the mount substrate 3 and the displacement magneto-electric transducers 4a and 4b, with respect to the magnetic flux generating source 5 by resilient deformation of the resilient member 2. This causes changes in electrical signals that are in proportion to displacement amounts to be obtained as outputs from the displacement magneto-electric transducers 4a and 4b. In contrast, even if a force is applied to the action portion 1, an electrical change in an output does not occur at the mount substrate 6 to which the fixed magneto-electric transducer 7 is mounted. That is, a change in the output occurs at the fixed magneto-electric transducer 7 when a change in a magnetic flux amount generated at the magnetic flux generating source 5 is changed by environmental changes, such as an increase (or decrease) in temperature or a change in the magnetic flux generating source 5 with time.

A method of calculating a force and a moment will be described with reference to FIG. 1. For example, it is assumed that the action portion 1 receives a force Fz in a Z-axis direction and a moment My in a Y-axis direction. Amounts of changes in magnetic flux densities that pass through the displacement magneto-electric transducers 4a and 4b and the fixed magneto-electric transducer 7 are B4a, B4b, and B7. kz and ky are sensitivity coefficients for calculating the force and the moment from the amounts of changes in the magnetic flux densities:

$$Fz = kz((B4a + B4b) - B7)$$

$$My = ky(B4a - B4b)$$

As mentioned above, by taking the differences between the elements, the force and the moment applied to the action portion 1 can be calculated from the amounts of changes in the magnetic flux densities that pass through the displacement magneto-electric transducers 4a and 4b and the fixed magneto-electric transducer 7. Here, it can be seen that the fixed magneto-electric transducer also functions as an output reference element not only when a temperature change is detected (described below), but also when a force is detected.

Figure 2:
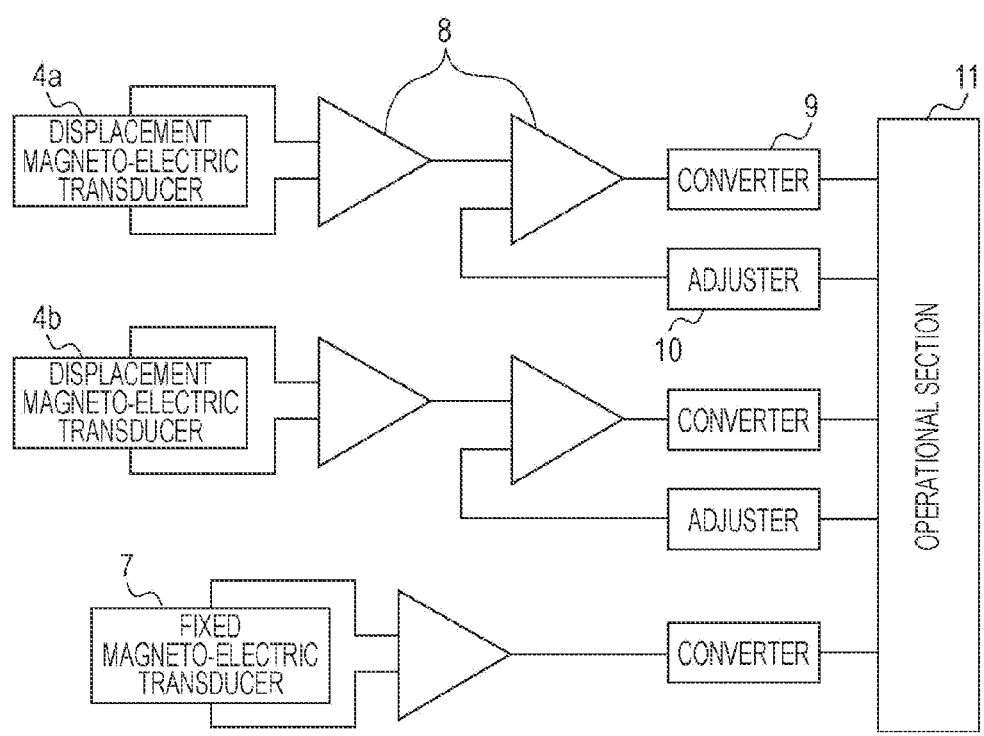
FIG. 2 illustrates a temperature compensation method according to the present invention.

Next, a temperature compensation method according to the present invention will be described with reference to FIG. 2. Reference numerals 4a and 4b denote the aforementioned displacement magneto-electric transducers and reference numeral 7 denotes a fixed magneto-electric transducer.

Reference numerals 8 denote signal amplifiers for amplifying signals of the magneto-electric transducers. The signal amplifiers 8 are connected to the magneto-electric transducers. Reference numerals 9 denote signal converters for loading output signals into an operational section from the magneto-electric transducers, and are connected to the signal amplifier 8. Reference numerals 10 denotes signal adjusters that perform feedback operations to the displacement magneto-electric transducers on the basis of an operational result of the operational section. The signal adjusters 10 are formed so that a signal for performing a correction operation can be output before outputs of the displacement magneto-electric transducers are input to the converters 9.

When the magnetic field generated by the magnetic flux generating source 5 varies by ΔB due to, for example, a temperature variation or a change with time, an output voltage of the fixed magneto-electric transducer 7 changes by ΔV7=ΔksB. Here, ks represents a coefficient for converting from a flux change amount to the output voltage. A process from performing detection of a variation amount of the generation magnetic field to performing the correction operation will be described below.

<1. Detection of Variation Amount of Generated Magnetic Field>

A change in output of the fixed magneto-electric transducer 7 due to a variation in a generated magnetic field of the magnetic flux generating source 5 through the converter 9 is detected by the operational section.

A signal amplification factor of the signal amplifier 8 is a G-fold factor. When an output voltage of the fixed magneto-electric transducer 7 is changed by the variation in the magnetic field, a voltage that is output through the signal amplifier 8 changes by ΔVt=GΔV7. The change amount ΔVt is detected by the operational section using the converter formed by, for example, an A/D converter. This makes it possible to calculate a magnetic flux density that has changed from $\Delta B=\Delta Vt/ksG$. Here, a detection resolution of the converter must allow satisfactory detection of the change to be corrected.

<2. Correction of Sensitivity Coefficients>

When the magnetic field generated by the magnetic flux generating source 5 changes, an output of the magneto-electric transducer, generated by changing the positions of the action portion 1 and the magnetic flux generating source 5 relative to each other by an external force, also changes.

Therefore, in order to calculate a precise external force value from the output of the magneto-electric transducer, it is necessary to correct the sensitivity coefficients kz and ky of the sensor output in accordance with the magnetic field that is generated. As mentioned above, if, on the basis of the magnetic flux change $\Delta B$, the magnetic flux density before the change is B, sensitivity coefficients after the correction taking into consideration the variation in the magnetic field that is generated are $\{(B-\Delta B)/B\}\times kz$ and $\{(B-\Delta B)/B\}\times ky$. When the magnetic field that is generated does not vary ($\Delta B=0$), the value of $(B-\Delta B)/B$ becomes 1, and the aforementioned sensitivity coefficients become kz and ky, respectively.

<3. Offset Operation>

When the magnetic field generated by the magnetic flux generating source 5 is changed, the output of the fixed magneto-electric transducer 7 is changed by $\Delta Vt$ from a reference voltage value for when the output is input to the converter 9. On the basis of $\Delta Vt$, which is the difference, an offset $\Delta Voff$ of each displacement magneto-electric transducer 4 is calculated at the operational section. The output voltage of each displacement magneto-electric transducer 4 is changed by $\Delta V4=kd\Delta B$, so that $\Delta Voff=G\Delta V4$. Here, kd is a coefficient for converting from the magnetic flux change amount to the output voltage. As discussed in the section of detecting the variation amount of the magnetic field that is generated, $\Delta B$ can be calculated from $\Delta Vt$, so that $\Delta Voff$ can be calculated. The adjusters 10 perform feedback operations to the signal amplifiers 8 connected to the displacement magneto-electric transducers 4a and 4b so that the $\Delta Voff$ is canceled. This makes it possible to correct in real time the offset of each displacement magneto-electric transducer 4 on the basis of the output of the fixed magneto-electric transducer 7. When it is not necessary to correct in real time each offset because the variation amount of the magnetic field generated by the magnetic flux generating source 5 is very small with respect to a change in time, the difference from the reference voltage value of each displacement magneto-electric transducer (that is, the voltage value for when an external force is not applied to the action portion 1) may be canceled.

A signal range that can be input to each converter 9 is a particular range. Therefore, when the output of any displacement magneto-electric transducer is offset, the range that can be detected by the sensor is narrowed. The above-described offset operation is significant for suitably using the signal range that can be input to each converter 9.

<4. Output Calculation Operation>

Expressions that take into consideration the correction of the variation in the magnetic field that is generated are as indicated below. Here, $kp=(B-\Delta B)/B$ is a correction sensitivity coefficient.

$$Fz=kp\times kz\ ((B4a+B4b)-B7)$$

$$My=kp\times ky\ (B4a-B4b)$$

It can be understood that, since the offsets of the displacement magneto-electric transducers 4a and 4b are adjusted before inputting electrical signals to the converters 9, the offsets do not influence the calculations carried out by the operational section 11. Therefore, compared to a case in which a correction operation is not performed, it is possible to easily correct the variation amount of the magnetic field that is generated by only multiplying the correction sensitivity coefficient, so that an external force and a moment can be precisely calculated.

In the method according to the present invention, the sensitivity coefficients are corrected on the basis of the magnetic field that is generated by the magnetic flux generating source. Therefore, it is possible to correct changes in the generated magnetic field caused by factors other than temperature, such as changes in the generated magnetic field caused by changes with time that could not be corrected by a related method using a temperature compensation circuit.

As already discussed above, it is desirable that a change in output caused by an external force in the magnetic force sensor and a change in output caused by a variation in the magnetic field generated by the magnetic flux generating source 5 be precisely detected. To achieve this, it is necessary to dispose the magneto-electric transducers at locations where the amounts of changes in magnetic flux can be most easily detected. Therefore, studies thereof were conducted.

Figure 3:
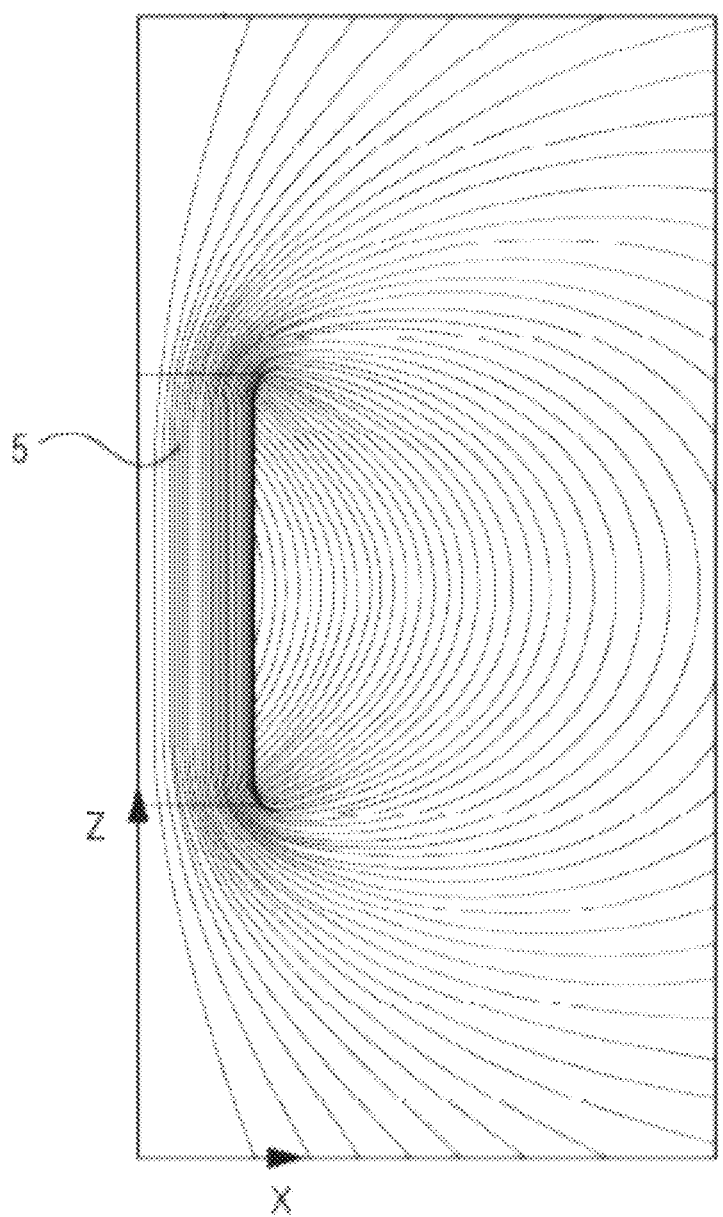
FIG. 3 shows magnetic flux lines obtained from a simulation using a two-dimensional static magnetic field model that is symmetrical with respect to a Z axis.
Figure 4:
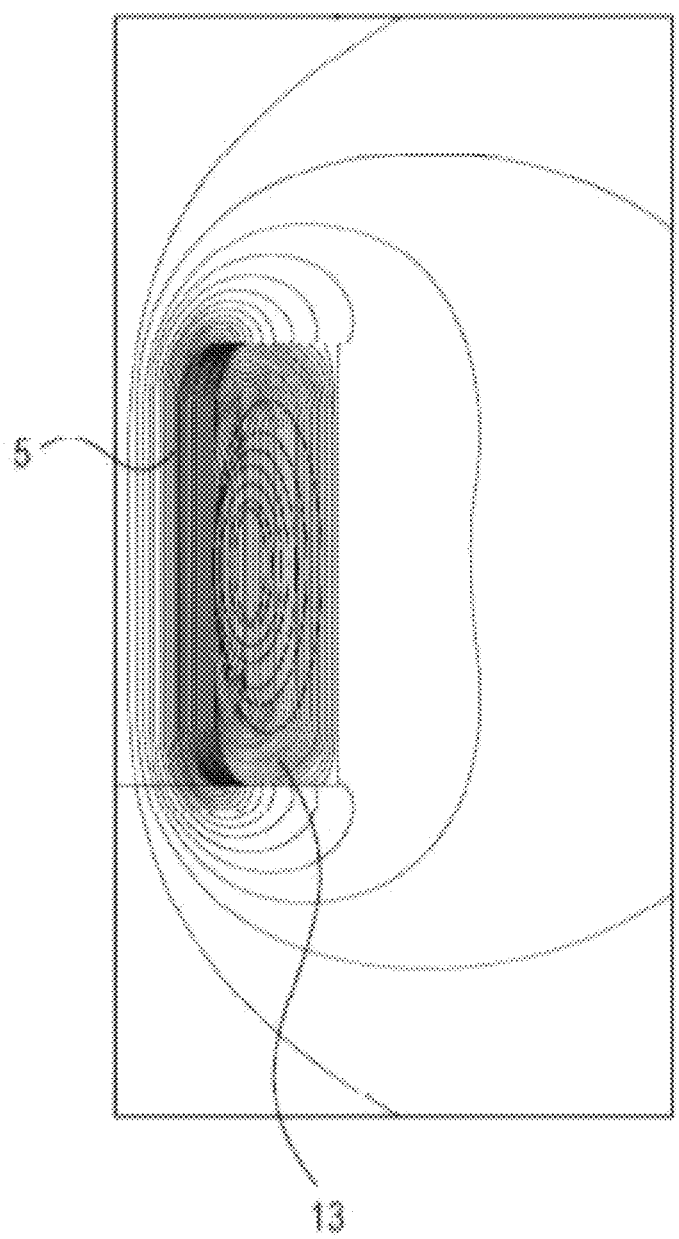
FIG. 4 shows magnetic flux lines obtained from a simulation using a two-dimensional static magnetic field model that is symmetrical with respect to a Z axis.
Figure 5A:
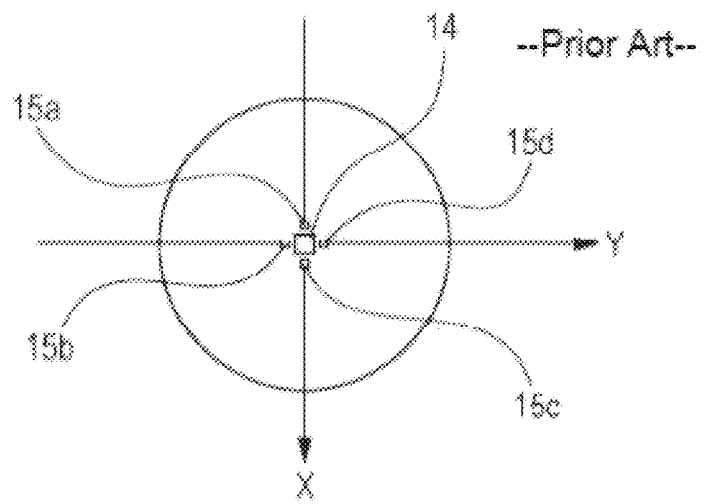
FIGS. 5A and 5B show a structure of a related magnetic Force sensor.
Figure 5B:
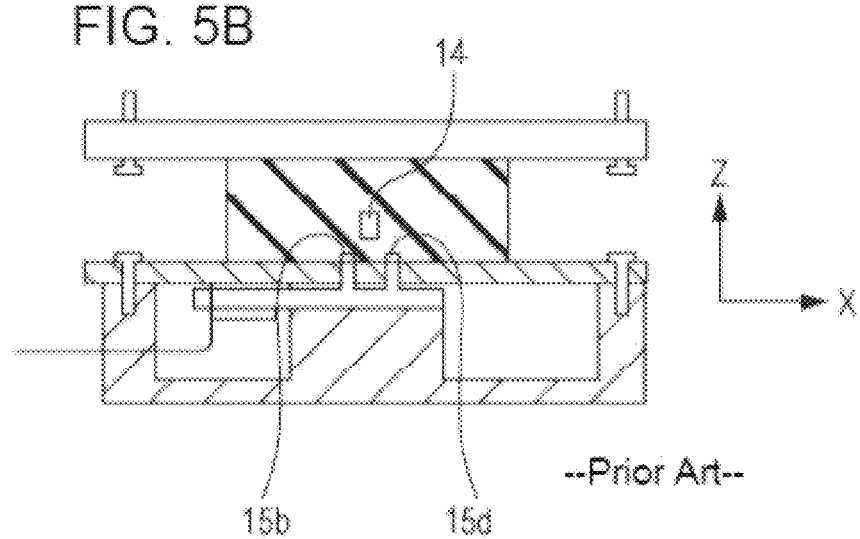
Figure 6A:
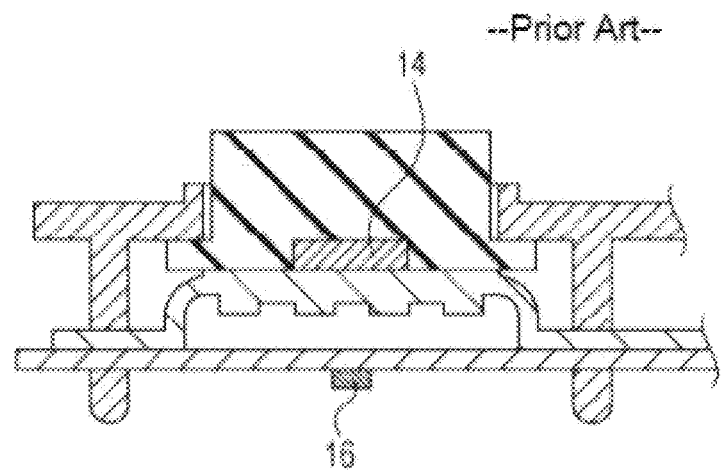
FIGS. 6A and 6B show a structure of a related force sensor.
Figure 6B:
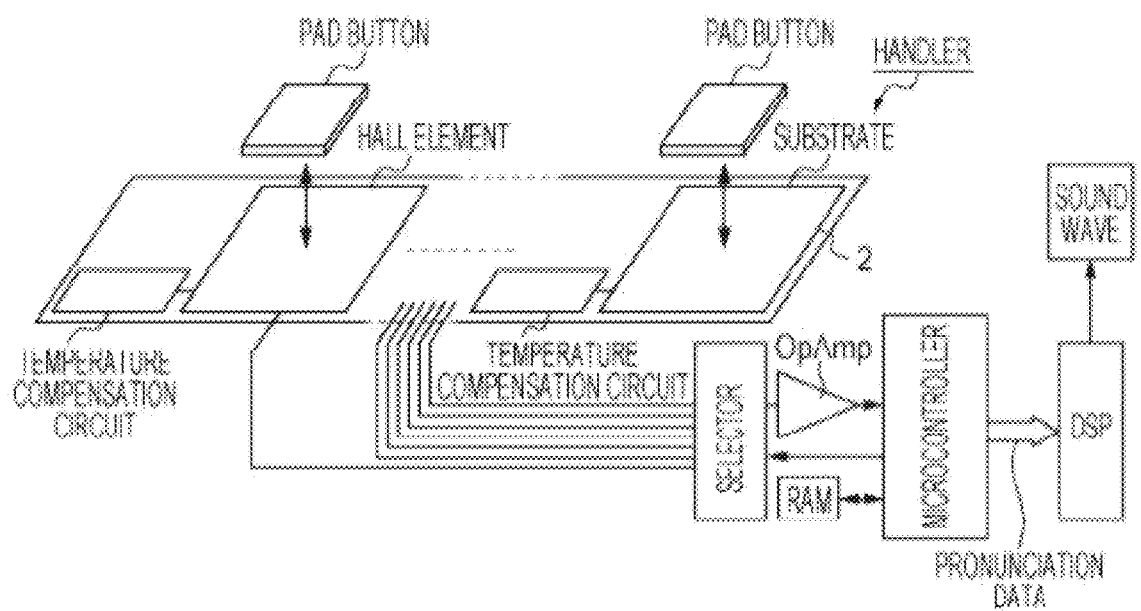

FIGS. 3 and 4 show magnetic-field simulation results. The simulations were performed using a two-dimensional static magnetic field model regarding the magnetic flux generating source 5 that was symmetrical with respect to a Z axis. Since the magnetic field that was generated was symmetrical in a left-right direction, in FIGS. 3 and 4, a center line of magnetic poles is drawn on the left end, and only the right half is shown.

In FIG. 3, a magnetic flux generating source 5 having a thickness of 4 mm in a Z-axis direction and a thickness of 2 mm in an X-axis direction is disposed in air. In FIG. 4, a magnetic material 13 having a thickness of 4 mm in the Z-axis direction and a thickness of 1 mm in the X-axis direction is wound upon the magnetic flux generating source 5.

Here, each magnetic flux generating source had characteristics of a Nd—Fe—B magnet having a residual flux density of 1.4 T and a coercive force of 1000 kA/m. The relative permeability of the magnetic material was set to 5000.

Locations where the amounts of changes of magnetic flux are largest are where magnetic flux lines are densest. From the results obtained from the case in which the magnetic flux generating source 5 alone was used (FIG. 3) and from the case in which the magnetic material that could control the flow of magnetic flux was disposed (FIG. 4), it is understood that the locations where the magnetic flux lines are densest, that is, where the amounts of changes of magnetic flux are largest, are near magnetic-pole end sides of each magnetic flux generating source 5.

On the basis of this result, the locations where the displacement magneto-electric transducers 4a and 4b and the fixed magneto-electric transducer 7 are disposed will be considered. It is difficult to mount the fixed magneto-electric transducer and the displacement magneto-electric transducers on the same substrate. Therefore, separate substrates need to be provided for mounting the fixed magneto-electric transducer and the displacement magneto-electric transducers. As a result, at least two substrates are required.

Magnetic flux lines are dense near the two magnetic poles (the north (N) pole and the south (S) pole) of the magnetic flux generating source. It can be understood that, if the magneto-electric transducers are provided near the magnetic poles, changes in displacements of the magneto-electric transducers relative to the magnetic flux generating source can be sensitively detected.

In particular, when, as shown in FIGS. 3 and 4, the magnetic poles of the rod-like magnetic flux generating source 5 have end sides, it is possible to fix the fixed magneto-electric transducer 7 to the end side of one of the magnetic poles, and to dispose the displacement magneto-electric transducers 4a and 4b at positions facing the other magnetic pole. It can be understood that such a structure makes it possible to most precisely detect the force and the variations in the magnetic field generated by the magnetic flux generating source.

The present invention is suitably applicable as a force sensor used in an industrial robot arm.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

The invention claimed is:

1. A force sensor for obtaining a force applied to an action portion comprising:
   the action portion supported by a supporting member;
   a first magneto-electric transducer and a second magneto-electric transducer fixed to the action portion;
   a magnetic flux generating source disposed so as to face the first magneto-electric transducer and the second magneto-electric transducer;
   a third magneto-electric transducer disposed at a fixed position with respect to the magnetic flux generating source for obtaining a change in a magnetic field,
   wherein the force sensor obtains forces applied to the action portion in at least two different axes directions simultaneously, from changes in output values of the first magneto-electric transducer, the second magneto-electric transducer and the third magneto-electric transducer, and
   wherein a relative position of the first magneto-electric transducer and the second magneto-electric transducer with respect to the magnetic flux generating source and the third magneto-electric transducer is changed by the force applied to the action portion.

2. The force sensor according to claim 1, further comprising an adjustor that feeds back an operational result of the operational processing section to the first magneto-electric transducer,
   wherein a feedback from the adjuster that cancels an offset of the first magneto-electric transducer is performed on the output of the first magneto-electric transducer, the offset of the first magneto-electric transducer being calculated on the basis of a difference between a previously set reference voltage value and a voltage value of the output of the third magneto-electric transducer for when an external force is not applied to the action portion.

3. The force sensor according to claim 1, further comprising an adjuster that feeds back an operational result of the operational processing section to the first magneto-electric transducer,
   wherein, when a magnetic field that is generated by the magnetic flux generating source is B, and a variation of the magnetic field, generated by the magnetic flux generating source, calculated on the basis of the output of the third magneto-electric transducer is $\Delta B$, a feedback from the adjuster for causing the output of the first magneto-electric transducer to be a $(B-\Delta B)/B$-fold output is performed.

4. The force sensor according to claim 1, wherein the third magneto-electric transducer is disposed near one of magnetic poles of the magnetic flux generating source, and the first magneto-electric transducer and the second magneto-electric transducer are provided near the other magnetic pole of the magnetic flux generating source.

5. The force sensor according to claim 1,
   wherein the first magneto-electric transducer is fixed together with a first substrate for mounting the first magneto-electric transducer to the action portion at a position facing a face of one of magnetic poles of the magnetic flux generating source,
   the second magneto-electric transducer is fixed together with a second substrate for mounting the second magneto-electric transducer to the supporting member at a position facing a face of the other magnetic pole of the magnetic flux generating source, and
   the magnetic flux generating source is fixed to the supporting member via the second substrate.

* * * * *